SIGNALLING CIRCUIT FOR HIGH CAPACITY EXCHANGE SYSTEMS

Filed Jan. 27, 1958

Inventor
S. L. HJERTSTRAND
By Robert Harding Jr.
Attorney 2,962,556

SIGNALLING CIRCUIT FOR HIGH CAPACITY EXCHANGE SYSTEMS

Svante Lennart Hjertstrand, Hagersten, Sweden, assignor to International Standard Electric Corporation, New York, N.Y., a corporation of Delaware Filed Jan. 27, 1958, Ser. No. 711,430

5 Claims. (Cl. 179—18)

Figures 1, 2:
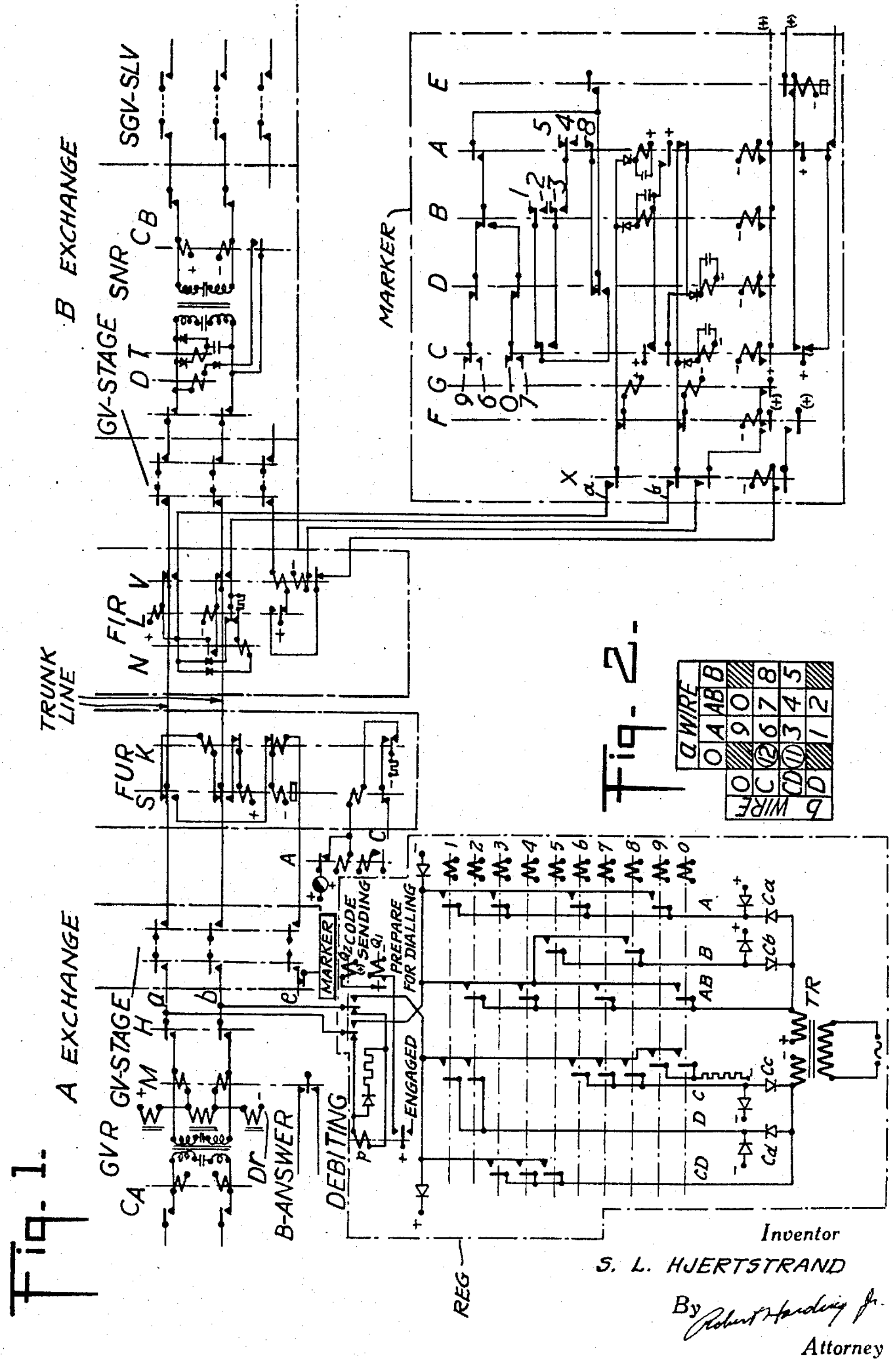

This invention relates to telephone systems and, particularly, to telephone exchange systems interconnected with one another by means of trunk lines preferably adapted for unidirectional traffic.

One of the objects of the invention is to provide a telecommunication system having a special arrangement for signalling over a trunk line by means of which the relay sets at the incoming and outgoing junctions may be simplified.

Another object of the invention is to provide a telecommunication system having a special arrangement for signalling in which the disconnect or release signal is more positive than has been the case with systems heretofore used.

Another object of the invention is to provide a telecommunication system having a special arrangement for signalling in which receiving devices respond to combinations of transmitted signals in a particular manner.

The above mentioned object and other features and objects of this invention and the manner of attaining them will become more apparent, and the invention itself will be best understood, by reference to the following description of an embodiment of the invention, taken in conjunction with the accompanying drawings, in which:

Fig. 1 is a circuit diagram of such of the circuit elements as are necessary to an understanding of the invention; and Fig. 2 is a table showing the numerical translation for different connections on the *a* and *b* wires.

The drawing illustrates the principles of the invention as applied to the following three types of signals: (1) trunk line signals; (2) digital signals; (3) supervisory signals for establishing connections. The invention will now be explained, with the aid of Fig. 1, and in connection with the sending of the said three signal types.

*Trunk line signals*

In the present system the following trunk line signals are used, that is, signals adapted to be exchanged between the relay sets FUR and FIR arranged to connect the trunk line to two telephone exchange stations: Free condition signals, seizure signals, and release signals.

A free condition signal from the "B" exchange at the right of the drawing to the "A" exchange at the left is transmitted from positive and negative in the relay set FIR, through the upper and lower windings, respectively, of relay L, and via the upper and next lower break contacts, respectively, of relay V to the upper and lower conductors of the trunk line, and this signal is received in the relay set FUR of exchange "A" over the upper and lower break contacts of relay S by the high resistance upper winding of relay K. The relay K, accordingly, is operated and attracts its armatures so as to apply negative potential through a resistor, shown at the bottom of FUR, via the make contact of relay K and the lowermost break contact of relay S, to the test wire *c*.

A seizure signal from the closed loop including the *a* and *b* wires, the parallel circuit of the winding of relay P and the rectifier and resistor in the register Reg, is transmitted upon seizure via the relay set FUR to operate line relay L in the FIR relay set. This causes positive potential to be applied from the marker in the "A" exchange to the *e* wire in the group selector stage GV of the "A" exchange, whereby relays S and K are caused to operate serially. This results in the two-wire trunk line becoming freely switched through the relay set FUR. The marker in the "A" exchange is similar to the marker shown more in detail in the "B" exchange. The marker in the "B" exchange is called by the relay L by means of positive potential applied over its lowermost make contact and via the lowermost break contact of relay V to the winding of relay X in the marker. The operation of relay X closes contacts connecting the marker to the *a* and *b* wires. In response to the established connection to the marker, relay G in the marker operates in a circuit from positive and negative, the upper and lower windings of relay G, upper make contacts of relay X, the *a* and *b* wires, to the rectifier and the upper make contact of relay L in series. Relay G operates relay F in an obvious circuit and relay F applies positive over its make contact to the lower winding of relay V, the other end of which is connected to negative potential. Thus, relay V operates and breaks the circuit for the winding of relay L and relay L releases. At this instant of time only relay N is connected to the trunk line via make contacts of relay V. Relay N is connected in series with a rectifier, so that the trunk line may be considered to be wholly free for all signals having positive potential on the wire *a* with respect to the wire *b*.

A release signal is transmitted from relay set FUR in response to a break of the *e* wire which causes relay K to release by opening the circuit through its lowermost holding winding. Relay S is of a slow-to-release type, whereby positive potential will be applied to the *b* wire and negative potential will be applied to the *a* wire through the upper and lower windings, respectively, of relay S. This causes relay N to operate in FIR via the upper make contact of relay V, the left rectifier, the winding of N, and the second make contact from the top of relay V. Operation of relay N is followed by the operation of relay L, the make contact of N closing an obvious circuit for that relay, whereby the resulting disconnection of positive potential over the lower break contact of relay L releases the succeeding group selector stage GV. (As mentioned above, the relay N is connected to the trunk line via break contacts of relay V.) However, relay V is maintained operated by positive potential over the lowermost armature of relay L operated and via its own holding contact. Operation of relay L inserts a resistor in series with the winding of relay N, this resistor being so chosen that relay N does not release, while relay S releases in relay set FUR. Relay N is not allowed to release before the relay S has released, whereupon the relays L and V are caused to release sequentially. In relay set FUR relay K is switched in circuit to the trunk line over break contacts of relay S and caused to operate in series with relay L (which remains in its unoperated state) as soon as relay V has been released in FIR.

*Transmission of digital signals*

Digital signalling is performed from a register to a marker in the other exchange and is initiated after receipt of a ready-to-dial signal emanating from the marker and characteristic of positive potential on the *a* wire and negative potential on the *b* wire from the upper and lower windings, respectively, of the G relay in the marker, via the break contacts of relay F. Such a ready-to-dial signal is detected in the register by relay P and at the same time relay G in the marker operates and operates relay F in an obvious circuit and the relay F disconnects and releases relay G. The requisite digit is then transmitted to the marker.

The digital signalling is effected by means of alternating potential superposed over positive potential on the *a* wire and negative potential on the *b* wire. This is effected by means of a transformer TR in the register, having a primary winding connected to the alternating current supply and two secondaries, the right-hand one having a terminal connected to plus (+) and the other having a terminal connected to minus (−). The other terminal of the right-hand winding may be connected in a manner to be described via a rectifier to the *a* wire in accordance with the following three connecting wire alternatives: A, or B, or A and B. A fourth alternative which may be utilized for signalling may be the lack of any connection between the transformer and the *a* wire. In a similar manner the *b* wire may be connected to the left-hand secondary winding of the transformer, viz. that connected to minus (−). Here also four connecting wire alternatives are available: D, or C, or D and C, or no connection between the left-hand secondary winding and the *b* wire.

In order to make these selective connections, a plurality of contact devices are provided in the register which are responsive to received signals representing digits. Thus, for example, relays designated 1 to 9 and 0 are shown, the windings thereof being selectively energized in a known manner by the received signals representing corresponding digits. Connections are made over the contacts of the relays 1 to 9 and 0 between the *a* and *b* wires and the ends of the secondary windings of transformer TR.

There are three wires from these relay contacts connected to each of the secondary windings, two of these wires including rectifiers which are oppositely poled. For example, rectifier C*a* is connected between one of these wires, labelled A, and the secondary winding connected to plus, while rectifier C*b* is connected between another wire, labelled B, and the same secondary. The remaining wire labelled AB is directly connected to the secondary without any rectifier. Similarly the wire labelled C is connected to the other secondary winding through a rectifier C*c*, while the wire labelled D is connected to the same secondary over a rectifier C*d*. The wire labelled CD is directly connected to the secondary without any rectifier. The three wires connected to each secondary are connected to different armatures of the relays 1 to 9 and 0, in the manner indicated. In order to illustrate the connection the following examples are given:

Assume that digit 1 has been received, operating relay 1. A circuit is then closed from the right-hand secondary winding of the transformer connected to plus, through the rectifier C*a*, the wire A to the right-hand armature of the relay 1, which is closed, thus connecting this particular secondary of the transformer to the *a* wire. Since the rectifier C*a* is poled for passage of current in the direction of the *a* wire, positive halves of the alternating current cycle will be applied to the *a* wire. At the same time a connection will be made from the left-hand secondary of the transformer TR connected to minus, through the rectifier C*d*, the wire D, and through the left-hand armature of the relay 1, which, being closed, connects that secondary of the transformer to the *b* wire. The rectifier C*d* is poled so that current can flow from the secondary through the rectifier to the *b* wire. Thus, the positive halves of the alternating current cycle are transmitted over this connection. We then have positive halves of the alternating current cycle applied to the *a* wire and positive halves applied to the *b* wire.

Assuming that a signal representing the No. 7 digit has been received by the register, the No. 7 relay will then be operated. This will close a connection from the secondary right-hand winding of transformer TR, over the wire labelled AB, through the right-hand make contact of relay 7, which is now closed, to the *a* wire. This will apply the full alternating current wave to the *a* wire. Simultaneously, a connection is made from the secondary winding connected to minus over the rectifier C*c*, the left-hand make contact of relay 7, which is closed, to the *b* wire. The rectifier C*c* is poled so as to permit the negative halves of the alternating current wave to be applied to the *b* wire.

Other of the relays 1–9 and 0, when operated, will make the necessary connections for connecting the secondaries of the transformer to the leads, A, B, C, and D, AB, CD as indicated in the table of Fig. 2.

At the other exchange, relays A, B, C, D and E are provided in the marker to respond to the signals, and the wires in the register have been labelled A, B, C, and D to indicate that the corresponding relays operate when these wires are connected to their respective transformer secondaries. The relays A and B are connected to the *a* wire and to positive potential connected to the winding of relay A via separate and individual rectifier gates, while positive potential is applied to the winding of relay B over armatures of relays A and C in their make positions, respectively. In a similar manner the relays C and D are connected between the *b* wire and negative potential. The relays A, B, C, and D operate in response to the alternating current in accordance with the selected combination of the connections A, B, C and D in the register. The secondaries of the transmitting transformer TR of the register are so positioned with respect to the primary that positive half-cycles simultaneously appear along the wires *a* and *b*.

It will be seen that, in the case of the transmission of digit No. 1, positive halves of the alternating current wave will pass over the *a* wire, through the upper winding of the relay A in the marker to operate that relay. After A relay is operated, positive halves of the alternating current wave passing into the marker over the *b* wire will energize the uppermost coil of the D relay over the make contact of the A relay. The A and D relays are now both operated. When the A relay operates, the E relay is operated over the lowermost make contact of A. This closes the uppermost make contact of E which completes a circuit (not shown) to the uppermost armature E and including the make contact of D, the break contact of C, the break contact of B, to the lead labelled 1 which completes the circuit for preparing the connection indicated by the No. 1 digit.

When the digit No. 7 is transmitted, the full alternating current wave on the *a* wire will operate the A relay over its uppermost winding, followed immediately by the B relay which is operated over its uppermost winding and over the make contact of A relay. Simultaneously the negative half waves of the alternating current on the *b* wire will operate the C relay over its uppermost winding. When either of the A or C relays operate, the winding of the E relay is energized, and this relay, after a slight delay, will operate, thus completing the circuit through its uppermost make contact, the upper make contact of A, the upper make contact of B, the break contact of D, and the make contact of C to the lead labelled 7 which completes the circuit for preparing the connection indicated by the digit No. 7.

It is pointed out that the E relay in the marker is made slow operating in order to give other relays time to set up the connections. It will also be seen that either the A relay or the C relay must be operated before the E relay can operate to complete the circuit for the preparation of the connection, because all of the digits, as indicated in Fig. 2, require the operation of either the A relay or the C relay.

In connection with this type of digital signalling the *a* wire always has a positive potential with respect to the *b* wire, so that relays N present in the relay set FIR are not able to influence, or to be influenced by, the transmission of digital signals.

The P relay is a polarized relay and when its armature is in the upper position, the digit sending connection is initiated. When its armature is in the lower position, an "engaged" or busy signal is produced over a circuit not shown.

The ready-to-dial signal in response to positive potential on the $a$ wire and negative potential on the $b$ wire operates the P relay to its upper position. At the same instant of time that the register receives said ready-to-dial signal, a seizure signal is transmitted in the opposite direction in the form of a closed loop to the means in the marker adapted to receive the digit in question. After this digit receiving means has been connected in circuit and the P relay has operated, it operates the $Q_1$ relay which, in turn, operates the $Q_2$ relay, and thus the loop is broken, whereby relay P releases and relay $Q_2$ transmits the digit during a predetermined period of time which is determined in a manner not shown by a pulse of positive potential supplied to the winding of $Q_2$.

When the signal pulse has ended, the A relay or the C relay or both are de-energized which closes a circuit from positive through the lowermost break contacts of these relays to a lead which extends to the group selector (in a manner not shown) in order to inform the group selector that the signal for that digit has been completed.

In the register, the wires $a$, $b$, A, B, C, and D connected to the secondaries of the transformer have additional rectifiers connected to them. These rectifiers are in turn connected to positive or negative potential and are so poled that the signal potential is prevented from going above or below a predetermined value.

In the case of calls over junction lines, the ready-to-dial signal is transmitted from relay L in FIR. Following the marker's connection to the trunk line, the loop is opened when relay V operates. Prior thereto the connection between the relay set FIR and the marker has been tested by the call relay G in the marker. Upon seizing the marker without cooperation with the relay set FIR the relay G is attracted directly by the loop through relay P of the register.

*Supervisory signals for the establishment of connections*

Answering a call at the called party's sub-set in the right-hand exchange is marked in the "B" subscribers' cord circuit SNR by the operation of current feed relay $C_B$, which in operating effectively connects the choke D across the trunk line. This causes operation of relay M in the "A" subscribers' cord circuit GVR, indicating that the call has been answered. Relay M is connected to a potential divider preferably consisting of chokes. When the called party in the "B" exchange restores, the relay $C_B$ releases, whereupon relay M also restores to its central or intermediate position. Metering signal is applied to the "A" subscribers' cord circuit GVR by transmitting over the line the full or approximately the full battery potential. Relay M, being connected to said potential divider, is then caused to actuate its armature to its opposite or lower position for metering.

An operator's signal may be achieved by means of an alternating current (not shown) superimposed on a direct current (in order to avoid operation of relay N in the relay set FIR). Such a signal causes the operation of relay T in the "B" subscribers' cord circuit SNR as an indication thereof.

While I have described above the principles of my invention in connection with specific apparatus, it is to be clearly understood that this description is made only by way of example and not as a limitation to the scope of my invention, as set forth in the objects thereof and in the accompanying claims.

What I claim is:

1. A telecommunication system comprising a first exchange, means including a two wire trunk line for connecting said first exchange with said second exchange, signalling means at said first exchange for transmitting digital information in code over said trunk line comprising a source of direct current, a source of alternating current superposed over said direct current, means including rectifier elements for selectively connecting said sources to the separate wires of said trunk line so that combinations of alternating current and rectified alternating currents of different polarities will be applied to said wires while maintaining a predetermined polarity on one of said wires with respect to the other of said wires, and signal responsive means at said second exchange responsive to said current combinations.

2. A telecommunication system, as defined in claim 1, in which the signalling means comprises a transformer having a primary winding connected to the source of alternating current and two secondary windings, means for connecting one end of a first secondary winding to the positive terminal of the direct current source, means for connecting one end of a second secondary winding to the negative terminal of said direct current source, first circuit means including a first pair of oppositely poled rectifier elements connected in parallel, second circuit means including a second pair of oppositely poled rectifier elements connected in parallel, and means responsive to signals representing digits for selectively connecting the other ends of said first and second secondary windings respectively to first and second wires of said two-wire trunk line through either, both, or neither, of said first and second pairs of rectifier elements.

3. A telecommunication system, as defined in claim 1, further comprising means in the second exchange responsive to a particular combination of portions of cycles of fluctuating current for preparing a connection characterized by said combination.

4. A telecommunication system, as defined in claim 1, further comprising means responsive to a reverse potential on the wires of said trunk line for releasing a connection previously completed over said trunk line.

5. A telecommunication system, as defined in claim 1, further comprising means for limiting the potentials of signalling currents on both wires of the trunk line to a predetermined value.

References Cited in the file of this patent

UNITED STATES PATENTS

| | | |
|---|---|---|
| 2,409,164 | Taylor et al. | Oct. 8, 1946 |
| 2,636,945 | Den Hertog et al. | Apr. 28, 1953 |
| 2,740,840 | Mange et al. | Apr. 2, 1956 |